United States Patent [19]

Billeter

[11] 4,235,478

[45] Nov. 25, 1980

[54] EMPTY AND LOAD BRAKE DEVICE

[75] Inventor: Henry R. Billeter, Marco Island, Fla.

[73] Assignee: Sloan Valve Company, Franklin Park, Ill.

[21] Appl. No.: 23,700

[22] Filed: Mar. 26, 1979

[51] Int. Cl.³ .............................................. B60T 8/20
[52] U.S. Cl. .................................. 303/23 R; 188/195
[58] Field of Search ........... 188/195; 303/22 A, 22 R, 303/23 A, 23 R

[56] References Cited

U.S. PATENT DOCUMENTS

| 2,362,931 | 11/1944 | Rodway | 303/23 R |
| 2,991,801 | 7/1961 | Larsson | 303/23 R X |
| 3,671,086 | 6/1972 | Scott | 303/23 R |

Primary Examiner—Duane A. Reger
Attorney, Agent, or Firm—Kinzer, Plyer, Dorn & McEachran

[57] ABSTRACT

An empty and load brake device for a railroad vehicle air brake system for controlling brake application pressure comprises a housing having an inlet connected to a pressure source and an outlet connected to an air brake cylinder. A valve is positioned within the housing to control communication between said inlet and outlet. A pressure proportional piston is movable within the housing and is positioned to open and close the valve. A latch is positioned within the housing and cooperates with the piston to lock the piston in a position in which said valve is held in an open position providing full communication between said inlet and outlet. Release of the latch permits the pressure proportional piston to throttle the flow of air through said valve to provide reduced pressure at the outlet. A load sensing arm is movably attached to the housing and controls operation of the latch.

11 Claims, 7 Drawing Figures

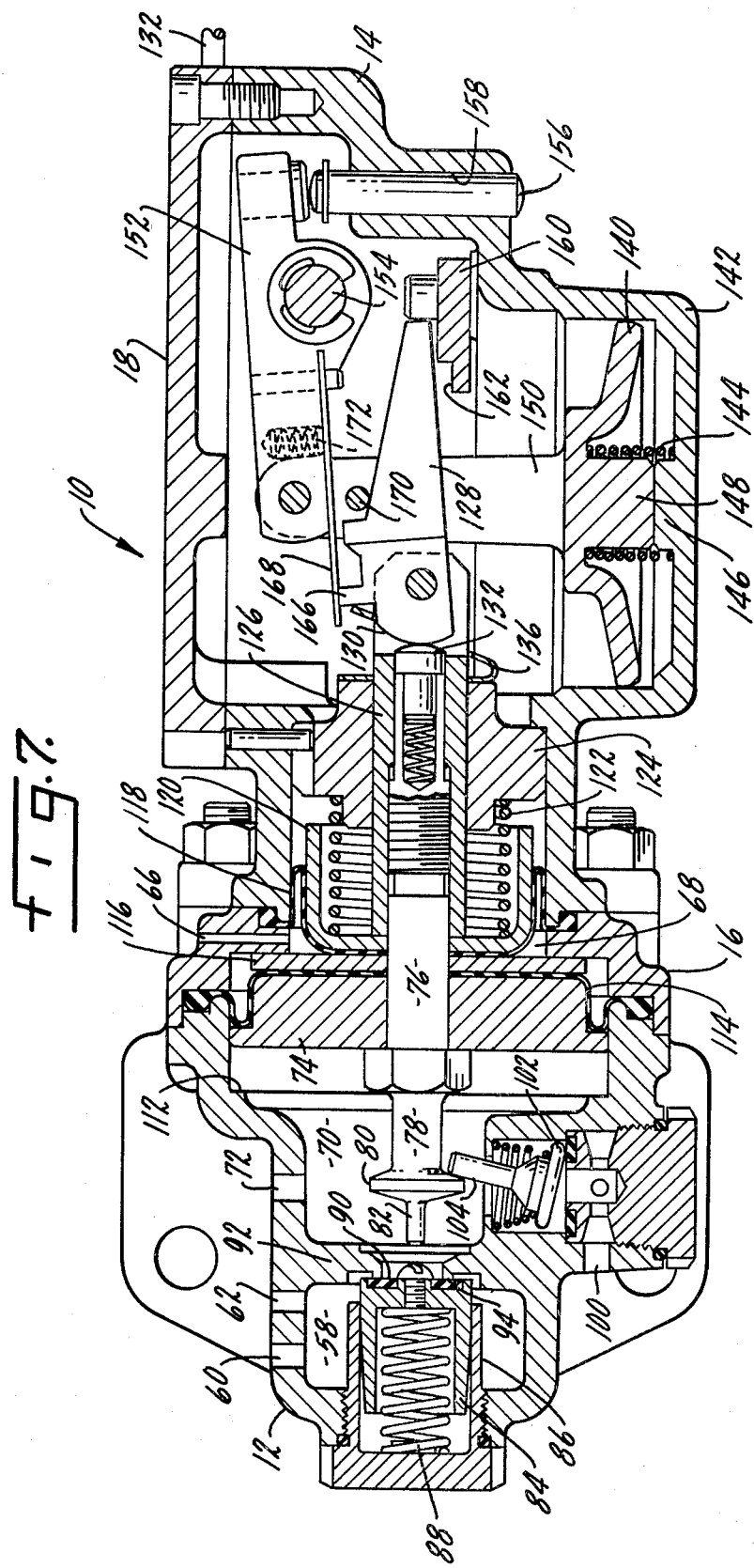

EMPTY AND LOAD BRAKE DEVICE

SUMMARY OF THE INVENTION

The present invention relates to empty and load brake devices for railroad vehicles and in particular relates to such a device in which a valve, operated by a pressure proportional piston, is either mechanically held open, or permitted to throttle air to the brake cylinder.

Another purpose is an empty and load brake device including dampening means preventing rough track conditions from providing a false indication of car loading.

Another purpose is a device of the type described which accurately determines the loading of a railroad car and then mechanically locks in o a particular pressure applying position.

Another purpose is a simply constructed reliably operable empty and load brake device of the type described.

Another purpose is an empty and load brake device for a railroad vehicle including a linkage providing reliable cooperative connection between a piston and a load sensing arm.

Another purpose is an empty and load brake device of the type described which eliminates many of the connections between various elements in a railroad vehicle brake system.

Another purpose is a device of the type described which eliminates the strut cylinder which was mounted on the bolster and had an arm which rode or sensed the position of the side frame relative to the bolster.

Another purpose is an empty and load brake device of the type described having simplified pipe connections between the various elements of a railroad air brake system.

Another purpose is an empty and load brake device of the type described which eliminates flexible connections and only utilizes pipes between elements.

Other purposes will appear in the ensuing specification, drawings and claims.

DESCRIPTION OF THE PREFERRED EMBODIMENT

Figure 1:
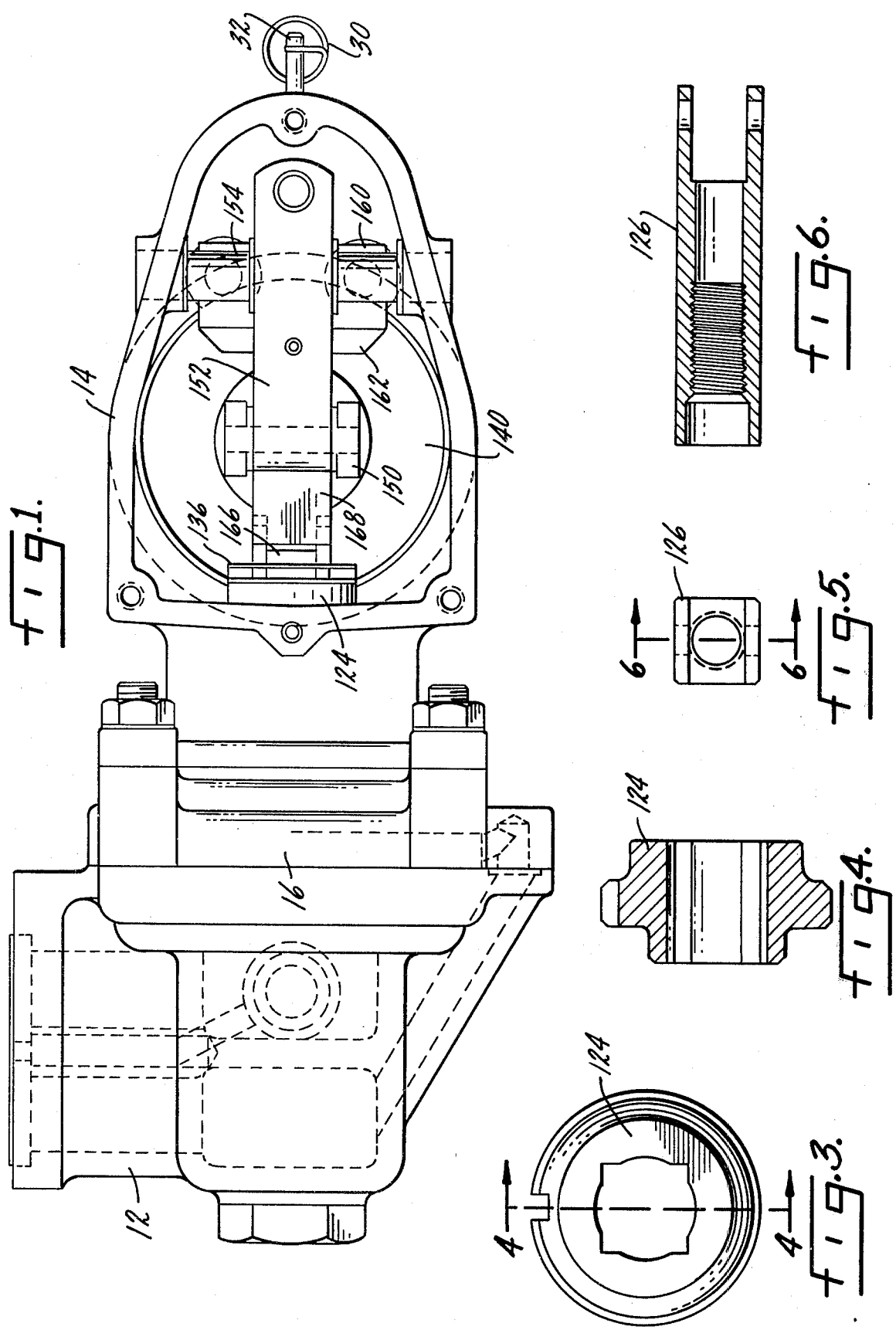
Figure 2:
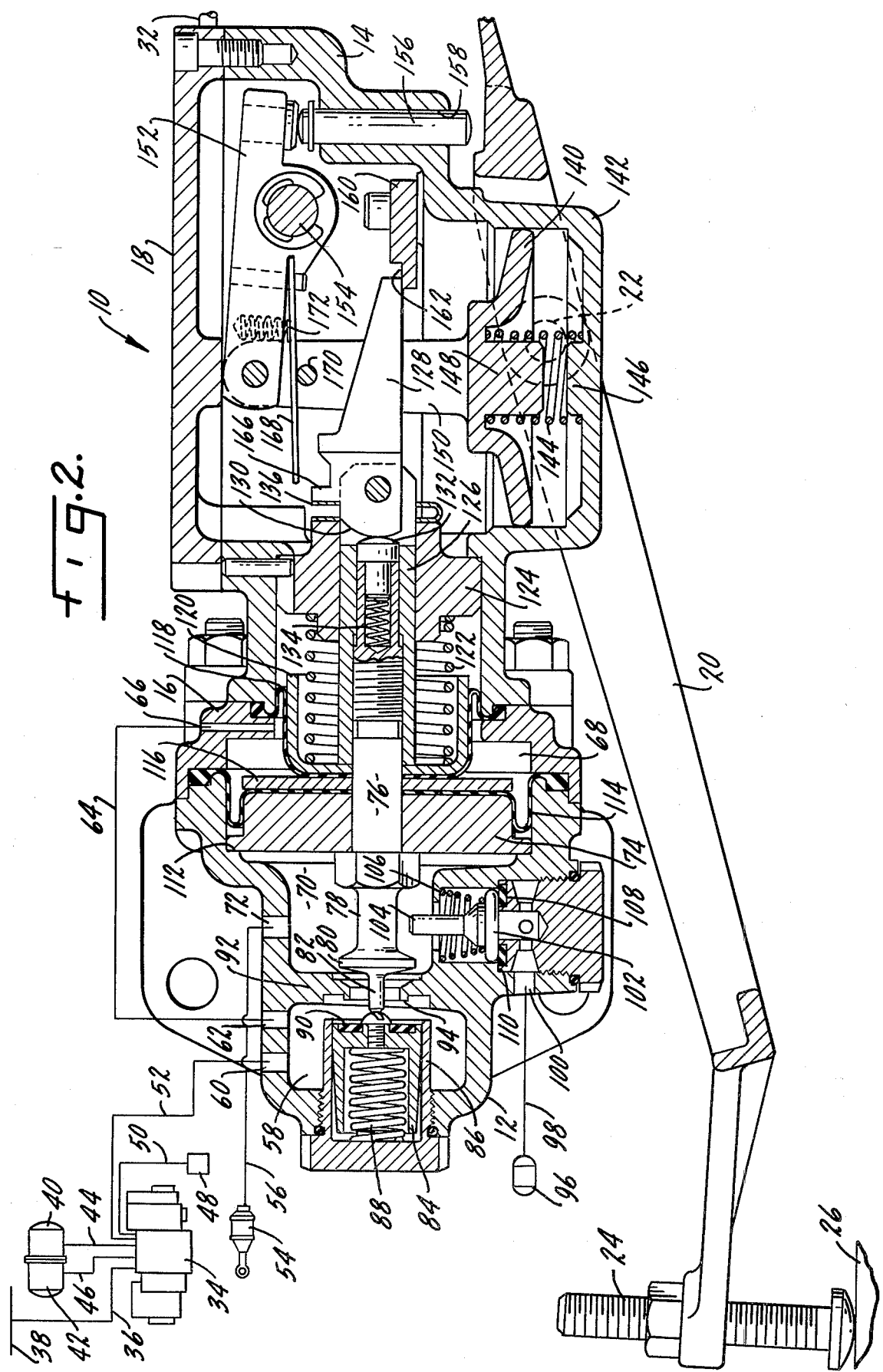

The invention is illustrated diagrammatically in the following drawings wherein:

FIG. 1 is a top view of the empty and load device with the cover removed to expose a portion of the interior, FIG. 2 is an axial section of the device of FIG. 1., FIG. 3 is an end view of the guide member, FIG. 4 is a section along plane 4–4 of FIG. 3, FIG. 5 is an end view of the connecting member, FIG. 6 is a section along plane 6–6 of FIG. 5, and FIG. 7 is a section, similar to FIG. 2, illustrating the device in an unloaded car position.

DESCRIPTION OF THE PREFERRED EMBODIMENT

The empty and load device includes a housing indicated generally at 10 and formed of individual housing sections 12 at the left side of FIG. 2, and 14 at the right side, and an intermediate section 16. Cover 18 is attached to housing section 14. A load sensing arm 20 is pivotally attached to the housing, as at 22, and has an adjustable contact screw 24 at one end. The screw 24 will ride upon the truck side frame. The housing 10 will be mounted on the car body. When the car is loaded the side frame will be in the position indicated at 26. As particularly shown in FIG. 1, a coil spring 30 is attached to a pin 32 extending outwardly from the housing with the opposite end of spring 30 being attached to the right-hand end of arm 20. Spring 30 will urge arm 20 toward a position for contact with the side frame. Spring 30 is merely illustrative of one construction for applying a bias on arm 20.

A typical railroad car air brake system is indicated in the upper left-hand corner of FIG. 2 and will include a control valve 34 which may be the conventional ABD valve. Valve 34 is connected by a pipe 36 to the main air brake pipe 38 which will include all of the usual air brake equipment not shown herein. Auxiliary and emergency portions 40 and 42 of the air reservoir are connected by pipes 44 and 46, respectively, to the control valve. A retainer valve 48 is connected by pipe 50 to the control valve and the control valve is connected to the empty and load device through pipe 52. A brake cylinder 54 is connected by pipe 56 to the empty and load device.

At the left-hand side of FIG. 2 there is a chamber 58 formed within housing 10 which has a port 60 connected to inlet pipe 52. A second port 62 is connected by a pipe 64 to an inlet 66 which in turn opens into a chamber 68 formed within the housing. Although an external pipe has been shown as the connection between ports 62 and 66, in some applications this may be an internal connection. A third chamber 70 has an outlet port 72 which is connected to pipe 56 and thus forms the connection to the air brake cylinder.

A large piston 74 is movable in the area between chambers 68 and 70 and is mounted upon a rod 76 which has a spool 78 at its left-hand end. Spool 78 has a shoulder 80 with the spool terminating in a tip 82. Tip 82, in the position of FIG. 2, is in contact with a valve member 84 movable within a sleeve 86 attached to the housing. A coil spring 88 is positioned within valve member 84 and urges the valve member and its recessed seal 90 toward the right in FIG. 2. Spring 88 provides light pressure just sufficient to seat the valve.

A partition 92 is formed between chambers 58 and 70 and has a valve seat 94 which is positioned for contact with seal 90 to thus form a means for closing off communication between chambers 58 and 70.

A reservoir 96 is connected by pipe 98 to a port 100 opening beneath a tilt valve indicated generally at 102. The tilt valve has a pin 104 positioned for contact with spool shoulder 80, depending upon the position of piston rod 76. A coil spring 106 maintains the tilt valve in its closed position, shown in FIG. 2, in which its seal 108 closes against a shoulder 110 of the housing.

Piston 74, in the position of FIG. 2, is limited in its left direction movement by a housing shoulder 112. The opposite side of the piston faces a rolling diaphragm 114 positioned adjacent thereto, which diaphragm is peripherally held between housing sections 12 and 16. On the opposite side of diaphragm 114 there is a spacer 116 and a second roll diaphragm 118 which is held peripherally between housing sections 14 and 16. Diaphragm 118 extends about a small piston 120 mounted on rod 76.

A coil spring 122 is coaxially arranged about piston rod 76 and biases spool 78 toward a position to open valve 84. The opposite end of spring 122 is held by a guide member 124 mounted upon a connecting member 126 which is threadedly attached to one end of piston rod 76.

A stop 128 is pivotally attached to connecting member 126 and has a rounded end 130 in frictional contact with a spring plunger 132 biased toward the stop by a spring 134 positioned within a bore in the connecting member. A U-shaped spring 136 is positioned between opposing surfaces of the stop and the guide member to bias the stop toward engagement with an abutment as will appear in more detail hereinafter.

A piston 140 is mounted within a cylindrical portion 142 of the housing, which cylindrical portion contains a suitable fluid to dampen movement of the piston. A coil spring 144 is mounted on a boss 146 of the housing and encircles a projection 148 of the piston to thus urge the piston outwardly from cylindrical portion 142. A yoke 150 may be integral with piston 140 or it may be a separate element attached thereto, with the yoke extending toward the opposite side of the housing and movable in a path generally perpendicular to that of piston rod 76.

Yoke 150 extends on opposite sides of stop 128 and is pivotally attached to a rocker arm 152 located on a pin 154. The opposite end of rocker arm 152 is positioned for contact with the upper end of a push rod 156 extending through a bore 158 in the housing with the exterior end thereof being in contact with arm 20. The push rod provides a connection between the rocker arm and the load sensing arm.

An abutment 160 is fixed within the housing and has a shoulder 162 which limits the movement of piston rod 76 and its attached stop 128 as will appear hereinafter. Stop 128 has a small shoulder 166 which is positioned for contact with a spring-like latch member 168, one end of which is held within a slot in rocker arm 152. Latch member 168 extends between the arms of yoke 150 and rests upon a pin 170 held at its opposite ends by the yoke arms. A small spring 172 is positioned within a bore in rocker arm 152 and urges latch member 168 downwardly upon pin 170.

Application of the Brakes on a Loaded Vehicle

When it is necessary to have an application of the brakes, the pressure in main air brake pipe 38 will be reduced in the usual manner which causes control valve 34 to supply air under pressure through pipe 52 and inlet port 60 into chamber 58. Air under the same pressure will pass from chamber 58 to chamber 68 through passage 64. The same pressure will also be applicable to the left side of piston 74 as it will pass through the unclosed partition 92 into chamber 70. Thus, the air applied from chamber 70 through port 72 to air brake cylinder 54 will be air pressure as supplied by the control valve 34. There will be no reduction in pressure. Although the pressure in chambers 70 and 68 is the same, since piston 120 and its associated diaphragm 118 are in contact with the right side of piston 74, thereby reducing its effective area by about 40 percent, there will be a net applied force on piston 74 which will tend to move it to the right. This right-hand movement will be against the air pressure-created force on the right side of piston 74 and against the force of spring 122. The piston, however, can only move to the right until stop 128 contacts the shoulder on abutment 160. There will be no further permissible movement of the piston means made up of the two pistons and the associated piston rod. Thus valve member 84 is held open and cannot close the partition between chambers 58 and 70. There is a full application of the brake pressure applied from the control valve 34 to the air brake cylinder.

Application of the Brakes on an Empty Vehicle

When the car is unloaded, arm 20 will move downward or in a counterclockwise direction under the influence of spring 30. Thus, there will be an upward force on push rod 156 which will cause dampening piston 140 to move downwardly within the cylindrical portion 142 of the housing. As the piston and its associated yoke 150 move downwardly, rocker arm 152 will force latch member 168 downwardly so that it rests upon stop 128. When air pressure is applied to chambers 58 and 68 in the manner described above, pressure will be supplied to chamber 70 which will cause piston 74 to move to the right. As the piston moves to the right, stop 128 will immediately contact lug 166 and be tilted or pivoted in a counterclockwise direction causing it to raise up and away from shoulder 162 of abutment 160. This change in position of the stop will permit the entire piston structure to move to the right. As the piston structure so moves, valve 84 and its associated valve seat will close partition 92 preventing further transfer of pressure from chamber 58 to chamber 70.

It is the pressure within chamber 70 which is in fact applied to the brake cylinder. The forces upon piston 74 consist of pressure upon the left-hand side of the piston and 60 percent of this pressure upon the right-hand side, the difference being caused by the presence of piston 120 and its associated diaphragm which are in contact with the right side of piston 74. Also, there is the applied force from spring 122 acting on the right side of piston 74 and thus upon piston rod 76. As the pressure applied from control valve 34 continues to increase, the pressure upon the right side of piston 74 through pipe 64, in cooperation with force from spring 122, will move the piston back to the left, thus opening the previously closed partition 92. In effect, there is a throttling of the opening in partition 92 with the end result that the pressure applied to the brake cylinder from chamber 70 is effectively 60 percent of any increase in pressure from control valve 34. The 60 percent figure is a satisfactory and preferred number, however, the invention should not be so limited. Different size relationships or area relationships between the opposite sides of the piston and different values for spring 122 can vary the amount of pressure which is actually applied to the air brake cylinder over that supplied from control valve 34.

To compensate for reduction in air consumption when operating in the empty condition, space in the form of reservoir 96 is provided. Thus, as piston rod 76 moves to the left, as controlled by the position of stop 128 and its cooperating abutment 160, spool portion 80 will contact tilt valve 104 causing the valve to move to a position to open communication through pipe 98 with reservoir 96. Although the quantity of air may be the same under either empty or loaded conditions, since the pressure is lower, reservoir 96 provides the needed additional volume. At the end of a brake application, the air in reservoir 96 will flow back, through the tilt valve, into chamber 70, and thus into chamber 58 and will return to the car air brake system in the normal manner just as in a brake release on a fully loaded car.

It should be understood that the actual movement of piston 76 and its throttling effect on valve 84 and the partition opening, will be quite rapid. The effect of such throttling or rapid movement of the piston will be to decrease the actual pressure applied to air brake cylinder 54 to the number indicated or to different convenient value, depending upon the necessity of brake pressure for a particular car.

As can be seen by the above description, when the car is in a fully loaded position valve 84 is locked or held in an open position which provides complete communication between the source of air pressure and brake cylinder 54. Stop 128 will be held in position by abutment 160 preventing further rightward movement of the described piston structure. The pressure proportional piston is operable to hold valve 84 in the full open position. Thus, not only does the device accurately sense whether a car is in a loaded or unloaded condition, but once a particular position has been sensed, the device described herein is mechanically locked in position to insure that full pressure is applied to the brakes as would be necessary for a loaded car.

When a lightly or unloaded car is sensed, then the pressure proportional piston is permitted to fluctuate in position so as to throttle air passing by valve 84. As described, the position of valve 84 is modulated by the pressure proportional piston so that a predetermined pressure, determined by the area relationships of the piston, is actually applied to the brake cylinder.

The device is quite reliable. Latch 168 which controls movement of stop 128 is moved by rocker arm 152 and associated push rod 156. There is no undue strain on the latch member or any other component within the overall linkage which connects the pressure proportional piston with the load sensing arm.

In many prior devices air was wasted as that air not needed for a brake application was simply vented. As described herein, if less than a full brake application is required because of the condition of the car, less than the full quantity of air is applied to the brakes and the unused quantity is passed to a reservoir, for example such as shown at 96.

Of importance is the arrangement of piston 140 within the cylindrical portion 142 of the housing and the associated fluid, preferably hydrauIic fluid or oil, within which the piston moves. As there are track conditions which are extremely rough which could cause excessive movement of the truck side frame relative to the body of the truck upon which the empty and load device is mounted, it is important that there be no false indications of the true loaded condition of the car. The transmission of the position of arm 20 to the associated yoke is dampened by movement of piston 140 within the fluid in the cylindrical portion of the housing. Thus, instantaneous changes in the relative positions of the side frame and the car body will not affect the function of the empty and load device.

Looking specifically at the spring forces applied to piston 140, spring 32, when there is contact between the lever arm and push rod 156, will provide a downward force upon the piston which is twice that applied in an upward direction by spring 144. Thus, the end result is a particular downward force applied to the piston. When there is no contact between the lever arm and push rod 156, the same force will be applied in an upward direction by spring 144, since there will be no downwardly-applied force. The dash pot piston will have equal and oppositely-directed forces applied to it depending upon whether the car is in a loaded or unloaded condition. Since movement time of the spring in opposite directions is equal, the dash pot piston will always assume the same position whether the track is rough, smooth or if the car is stationary. Thus, rough track is not interpreted as a load or a lack of load.

Since housing 10 is mouted upon the car body, all connections with the air brake system can be made with pipe, eliminating unsatisfactory hose connections. Prior empty and load devices using the so-called strut cylinder which was mounted on the bolster with a sensing arm for the side frame required flexible connections.

Whereas the preferred form of the invention has been shown and described herein, it should be realized that there may be many modifications, substitutions and alterations thereto.

The embodiments of the invention in which an exclusive property or privilege is claimed are defined as follows:

1. An empty and load device for a railroad vehicle air brake system for controlling brake application pressure comprising, a housing having an inlet connected to a pressure source and an outlet connected to an air brake cylinder, valve means in said housing controlling communication between said inlet and outlet, pressure proportional piston means movable in said housing and positioned to open and close said valve means, latch means in said housing and cooperating with said piston means to latch said piston means in a position in which said valve means is held open providing full communication between said inlet and said outlet, release of said latch means permitting said piston means to throttle the flow of air through said valve means to provide reduced pressure at said outlet, and a load sensing arm movably attached to said housing and controlling operation of said latch means.

2. The device of claim 1 further characterized in that said latch means includes a stop member attached to said piston means, an abutment positioned to engage said stop member, and a latch member for causing movement of said stop member relative to said abutment.

3. The device of claim 2 further characterized in that said stop member is pivotally attached to said piston means and said latch member effects pivotal movement of said stop member away from engagement with said abutment, and spring means urging said stop member toward engagement with said abutment.

4. The device of claim 2 further characterized by and including a rocker arm pivotal in said housing and carrying said latch member, and a push rod effective between said rocker arm and load sensing arm.

5. The device of claim 2 further characterized by and including means for dampening movement of said latch member to prevent rough track conditions from simulating a loaded or unloaded vehicle.

6. The device of claim 5 further characterized in that said dampening means includes a fluid dampened piston movable in said housing and connected to said latch member, and oppositely directed spring means acting upon said fluid dampened piston.

7. The device of claim 6 further characterized by and including a rocker arm pivoted in said housing and carrying said latch member, said fluid dampened piston being connected to said rocker arm.

8. The device of claim 1 further characterized in that said valve means includes a spring normally urging said valve means toward a position closing communication between said inlet and outlet.

9. The device of claim 1 further characterized in that said pressure proportional piston means includes a first piston surface movable in a chamber communicating with said outlet port and a second piston surface movable within a chamber connected to said inlet port, said second piston surface having a predetermined area relationship to said first piston surface.

10. An empty and load device for a railroad vehicle air brake system for controlling brake application pressure comprising:

> housing means having an inlet connected to a pressure source and an outlet connected to an air brake cylinder, valve means in said housing means for controlling communication between said inlet and outlet,
>
> pressure proportional piston means movable in said housing means and positioned to open and close said valve means to provide less than full inlet pressure at said outlet,
>
> a load sensing arm movably attached to said housing means, and means responsive to the position of said load sensing arm for effecting direct full communication between said inlet and outlet.

11. The device of claim 10 further characterized in that said means responsive to the position of said load sensing arm includes latch means in said housing means and cooperating with said piston means to latch said piston means in a position in which said valve means is held open to provide full communication between said inlet and said outlet.

* * * * *